C. D. ARMSTRONG.
VACUUM SIPHON PUMP.
APPLICATION FILED MAR. 30, 1914.
1,232,883.
Patented July 10, 1917.
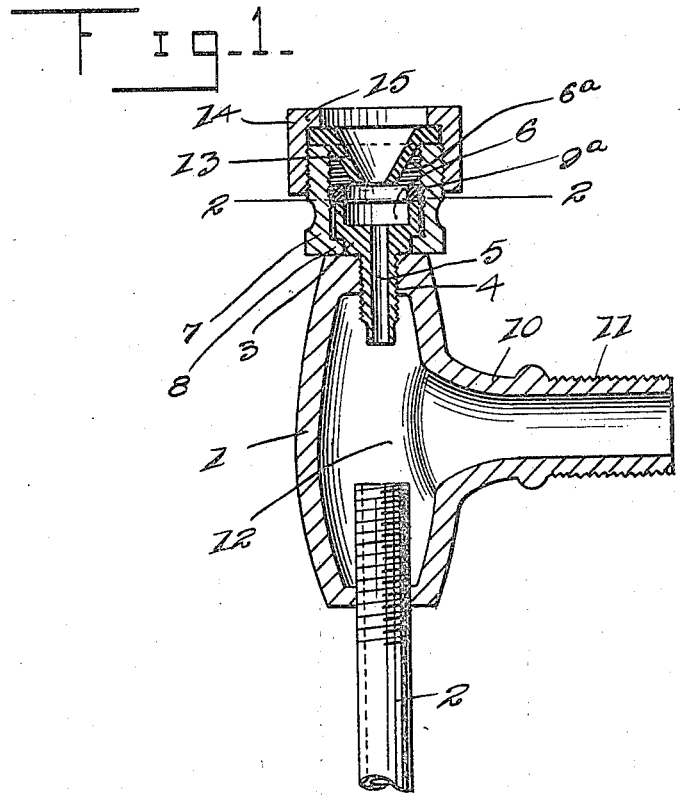
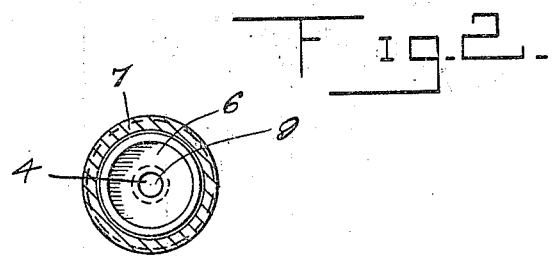
Witnesses
Inventor
C. D. Armstrong.
Attorney

UNITED STATES PATENT OFFICE.

CLYDE D. ARMSTRONG, OF CHICAGO, ILLINOIS.

VACUUM SIPHON-PUMP.

1,232,883.   Specification of Letters Patent.   Patented July 10, 1917.

Application filed March 30, 1914. Serial No. 828,363.

*To all whom it may concern:*

Be it known that I, CLYDE D. ARMSTRONG, a citizen of the United States, residing at Chicago, in the county of Cook and State of Illinois, have invented certain new and useful Improvements in Vacuum Siphon-Pumps; and I do hereby declare the following to be a full, clear, and exact description of the invention, such as will enable others skilled in the art to which it appertains to make and use the same.

This invention relates to vacuum siphon pumps, designed more particularly for the purpose of draining receptacles at some distance from a sink or water supply faucet, and one of the principal objects of the invention is to provide a simple attachment for an ordinary water supply faucet for creating a vacuum in a siphon pump of simple construction to drain receptacles at some distance from the sink by means of a hose connection.

Another object of the invention is to provide a simple vacuum siphon pump which can be applied to either a threaded faucet or a plain unthreaded discharge nozzle.

These and other objects may be attained by means of the construction illustrated in the accompanying drawing, in which, Figure 1 is a vertical section through a vacuum siphon pump made in accordance with this invention, Fig. 2 is a sectional view taken on the line 2—2 of Fig. 1 looking in the direction indicated by the arrows.

Referring to the drawing, the numeral 1 designates the casing for the pump, and 2 is a discharge pipe threaded in the lower end of the casing and projecting some distance into the casing as shown in Fig. 1 of the drawing. An intake member 3 is connected to the casing 1 by screw threads 4, and is provided with a central bore 5. The upper end of this intake member is enlarged and provided with an annular recess 6. A collar 7 is connected to the intake member 3 by the annular flange 8 which surrounds the enlarged upper end of said member, and the collar is exteriorly screw threaded to receive a nut 14, having an inwardly extending flange 15. The inlet element 10 projects at right angles to the casing 1 and is provided with a threaded exterior portion 11 to provide means for the attachment of a hose to be led off to the receptacle to be drained. The chamber 12 forms a vacuum compartment when the device is in operation.

When the pump is to be used with a faucet having a plain discharge nozzle, a rubber washer 13 is secured between the upper end of the collar 7 and the flange 15 of the nut 14, said washer having inwardly extending portions to embrace the plain nozzle and to make a water tight connection therewith.

When the pump is to be connected to a threaded discharge nozzle of a faucet, the washer 13 and the nut 14 are removed and the nozzle is connected to the screw threads 6$^a$ of the collar 7, the end of the nozzle bearing against a washer 9$^a$ to make a water tight connection.

When the hose is connected to the inlet 10 and is immersed at its free end in a receptacle containing a liquid upon a lower level than the pump, the vacuum in the chamber 12 created by the flow of water through the element 3 and out through the discharge pipe 2 into the sink, will draw the water in and discharge it with the hydrant water through the pipe 2 into the sink.

From the foregoing it will be obvious that a siphon pump made in accordance with this invention is simple in construction, can be quickly attached to any water supply faucet and will serve to drain a receptacle even if located fifteen feet or less below the faucet and at any required distance from the sink, depending upon the length of the hose.

Various changes may be made in the details of construction without departing from the spirit and scope of the invention as defined in the claim.

What is claimed is:—

In a vacuum siphon pump, the combination of a casing having an inlet, plain top and bottom walls provided with centrally screw threaded bores, of a coupling including a collar having an annular inturned flange adapted to rest on said top wall, said collar having internal and external screw threads on the upper portion thereof, an intake element fitted in said bore in said top wall having a shoulder bearing against said plain surface of said top wall, said intake element having an enlargement forming a second shoulder arranged above and extending from said first shoulder, said enlargement having a circular recess, said enlargement being adapted to engage and clamp the flange of said collar between said plain top wall of the casing thereby holding said collar securely on said casing.

In testimony whereof I affix my signature in presence of two witnesses.

CLYDE D. ARMSTRONG.

Witnesses:
JESSE A. YOUNGS,
MARGARET L. MURPHY.